Sept. 25, 1951 J. H. HOLLOWAY ET AL 2,569,002
DUAL FUEL INTERNAL-COMBUSTION ENGINE
Filed May 14, 1949 3 Sheets-Sheet 1

INVENTORS
John H. Holloway
Kenneth G. Jones
BY
Louis O. French
Attorney.

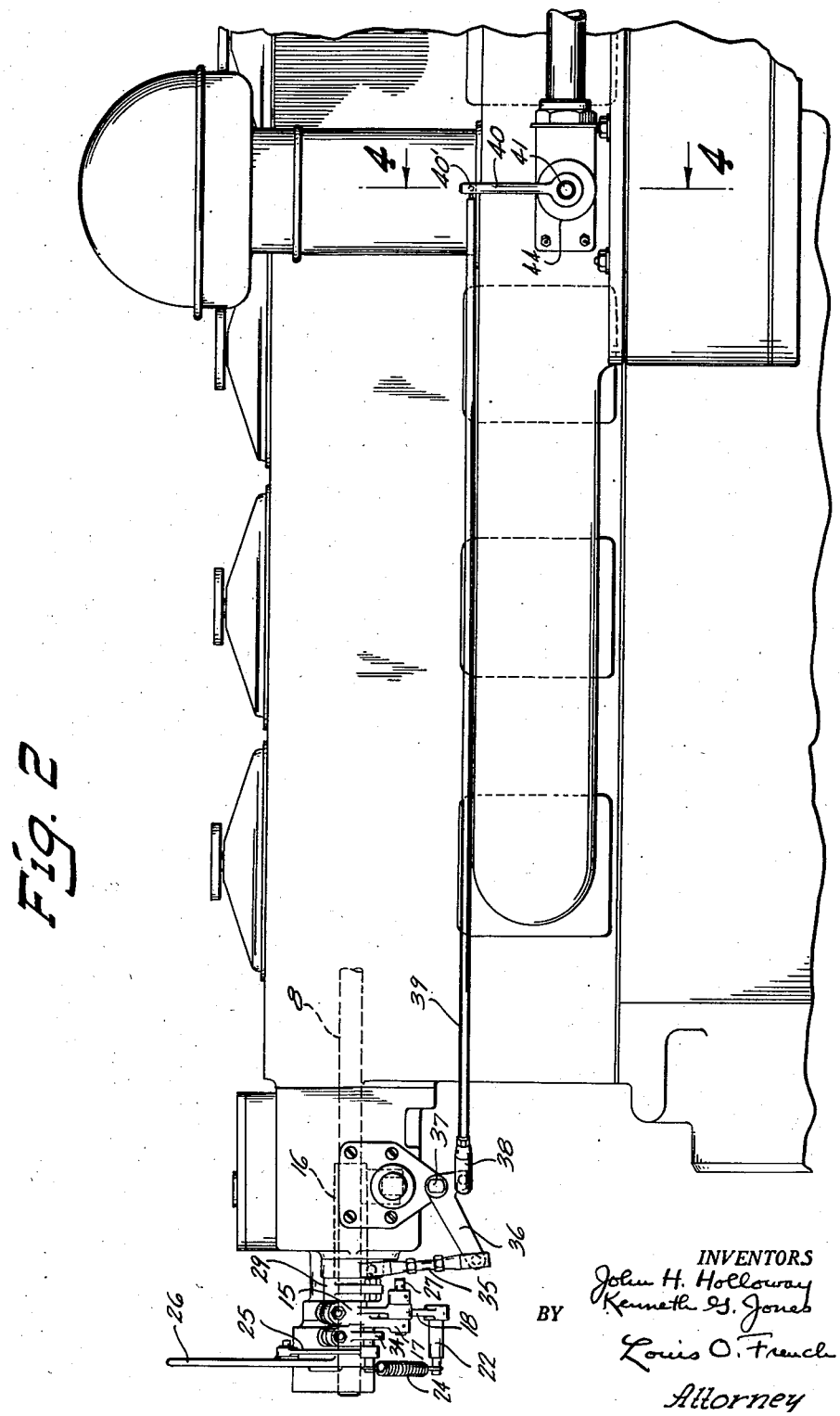

Sept. 25, 1951 J. H. HOLLOWAY ET AL 2,569,002
DUAL FUEL INTERNAL-COMBUSTION ENGINE
Filed May 14, 1949 3 Sheets-Sheet 3
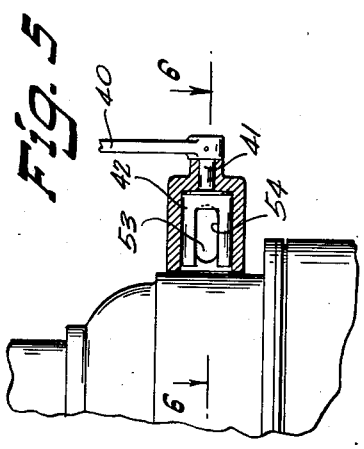
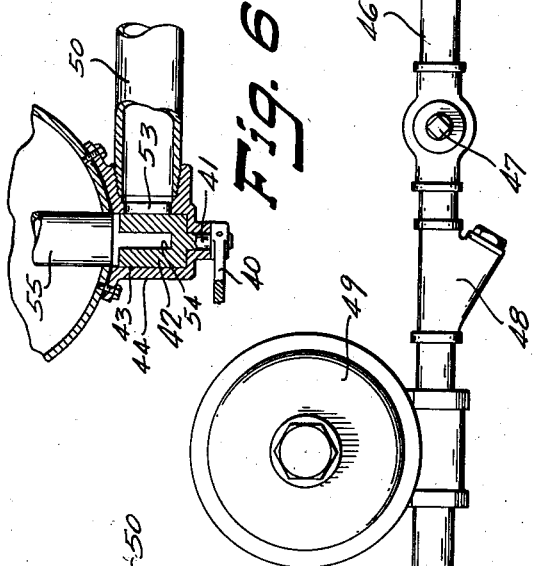
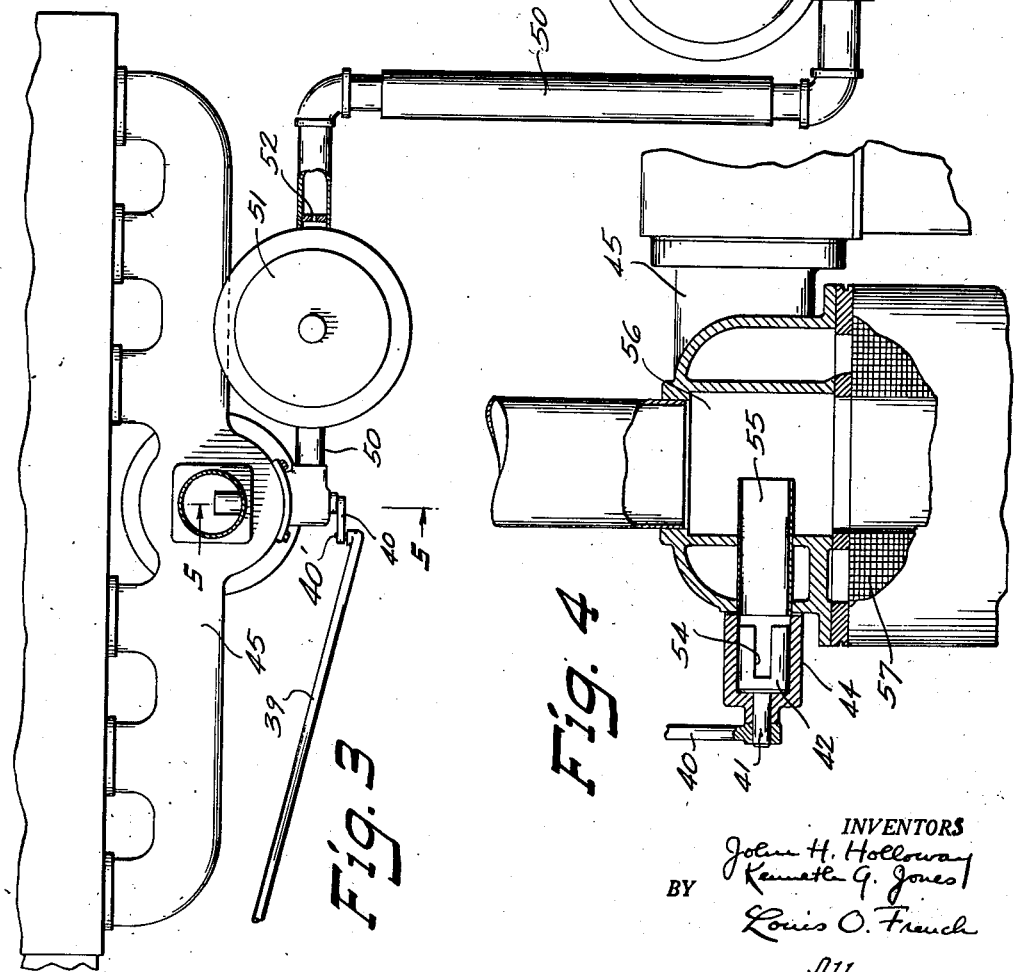

Patented Sept. 25, 1951

2,569,002

UNITED STATES PATENT OFFICE 2,569,002

DUAL FUEL INTERNAL-COMBUSTION ENGINE

John H. Holloway, Green Bay, and Kenneth G. Jones, De Pere, Wis., assignors to Murphy Diesel Company, Milwaukee, Wis., a corporation of Delaware Application May 14, 1949, Serial No. 93,234

2 Claims. (Cl. 123—27)

1

The invention relates to internal combustion engines and more particularly to a compression ignition engine which will operate on either oil or gas.

Dual fuel engines of the compression ignition type are known. Some of these provide for running on oil or diesel fuel alone, on gas with a small pilot ignition charge of oil, and partly on gas and oil. After considerable experimentation, we have found that the most satisfactory results are obtained by operating on oil alone or on gas with a pilot oil charge and with an excess of air for either operation. Such a method of operating dual fuel engines permits of the use of compression pressures high enough to secure satisfactory operation on diesel fuel alone and still permit operation at the same pressures on gas without danger of pre-ignition at varying speeds and loads. The object of the present invention is to provide a novel control for switching from one type of fuel to the other associated with a single governing means and a novel means for metering the gas at various speeds and loads while maintaining the air supply constant.

The invention further consists in the several features hereinafter set forth and more particularly defined by claims at the conclusion hereof.

In the drawings:

Fig. 2 is a front elevation view of an engine equipped with apparatus embodying the invention, parts being broken away;

Fig. 3 is a plan view of the gas supply and metering mechanism, parts being broken away and parts being shown in section;

Fig. 4 is a detailed side elevation view of the engine, parts being broken away and parts being shown in section;

Fig. 5 is a detailed vertical sectional view taken on the line 5—5 of Fig. 3;

Fig. 6 is a detailed horizontal sectional view taken on the line 6—6 of Fig. 5.

Figure 1:
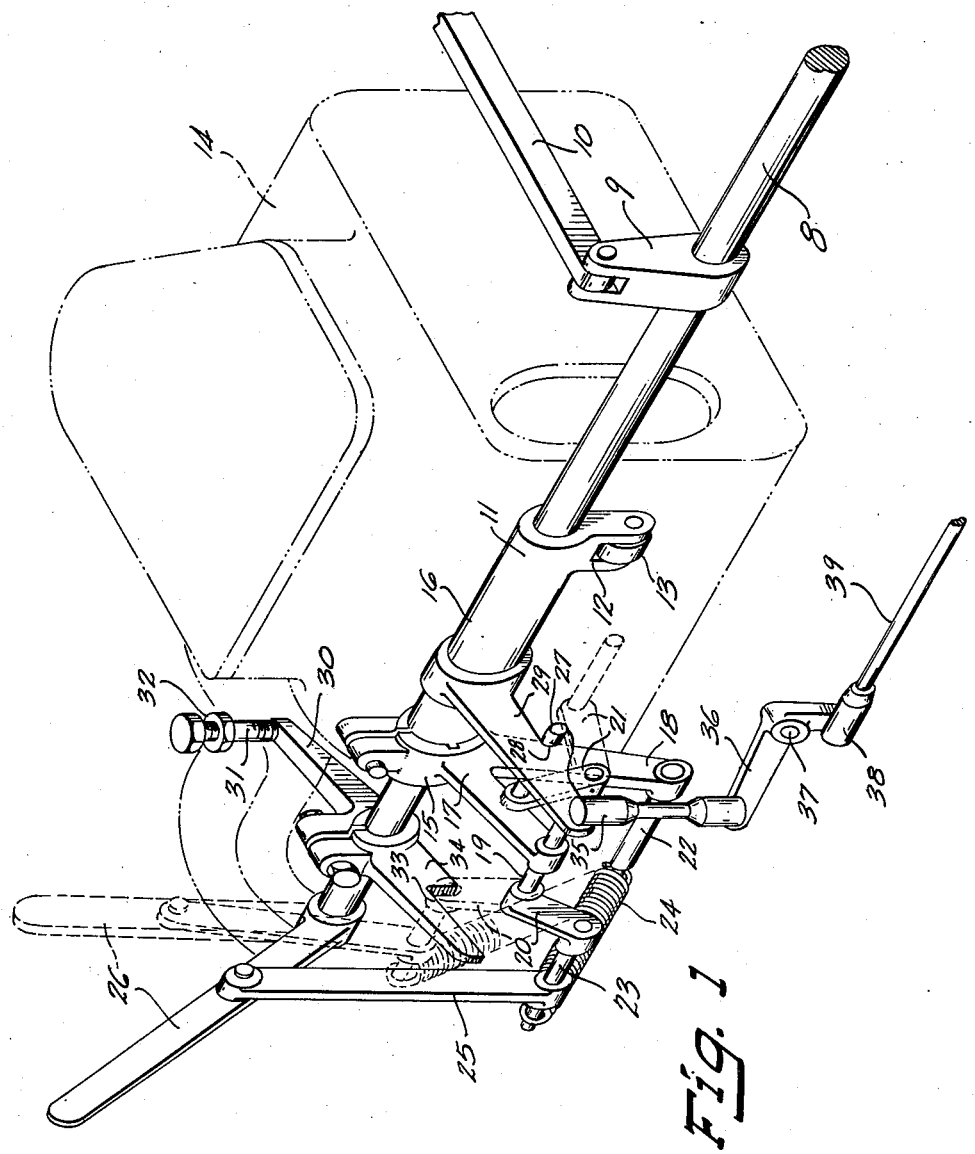
Fig. 1 is a perspective view of control mechanism embodying the invention.

Referring to the drawings, the numeral 8 designates a fuel metering control shaft which runs the length of the engine. Adjacent each cylinder the shaft 8 is provided with a crank 9 which is connected to what may be termed a reciprocatory fuel metering control rack bar 10 which in the present disclosure is the bar 86 of U. S. Patent No. 2,437,529, of March 9, 1948, to John H. Holloway, and as shown in Fig. 3 of that patent reciprocation of said bar under governor control acts through gearing to control the angular adjustment of the fuel pump plunger which has

2 control edges cooperating with relief ports to control the amount of fuel delivered by the injector to the engine. In the patent above mentioned the fuel injectors are of the unit type, but it is obvious that the shaft 8 may be connected with the rack bar of a multi-cylinder fuel pump or the rack bars of separate pumps where such pump or pumps supply separate injectors to control the metering of fuel to the respective cylinders of an engine. The shaft 8 is under the direct control of the governor when the engine is operating on fuel oil and is turned to a predetermined set position for metering the pilot oil charge when the engine is operating on gas.

To permit the shaft 8 to be connected and disconnected with the governor, a governor operated member 11 loosely mounted on said shaft is adapted to be connected and disconnected from said shaft, said member having a crank arm 12 provided with a roller 13 which is moved by a hydraulically operated governor in the governor housing 14 against the action of a return spring (not shown). The governor mechanism is of known construction, and therefore, further details thereof are not deemed necessary since any suitable governor mechanism may be used to operate the member 11 which it will be understood is at all times under governor control whether the engine is operating on oil or gas.

Referring to Fig. 1, a member 15 is keyed or fixed to the sleeve hub 16 of the member 11 and has angularly disposed crank arms 17 and 18. The outer end of arm 17 carries a pin or shaft 19 which extends through said arm and carries crank arms 20 and 21. The outer end of the crank arm 18 carries a pin or shaft 22. The outer end of the crank arm 20 carries a shaft 23. The shafts 22 and 23 are connected together by a tension spring 24. The shaft 23 is operatively connected by a link 25 to the intermediate portion of a manually controlled lever 26 mounted on the shaft 8 for movement from the full line position for operation on gas to the dotted line position for operation on oil. Shifting of the lever 26 does not shift the member 11 and its arms 17 and 18 but acts through the link 25 and shaft 23 to oscillate the shaft 19 and the crank arms 20 and 21. The crank arm 21 carries a pin 27 at the outer end thereof which when the engine is operating on gas is adapted to engage in a notch 28 in a crank arm 29 free or loose on sleeve hub 16, and when so engaged, acts to lock said arm 29 for movement with said member 11 since under these conditions the pin 27, crank 21, and shaft 19 connect arm 29 for direct movement with arm 17 of member 15 which is fixed to member 11. Thus the governor acting on the member 11 will control the position of the gas controlling lever 29. When the engine is operating on gas, the injectors are adjusted so as to furnish only a small pilot charge of oil to the engine cylinder, usually about ten per cent or less of the charge required for direct oil operation, and the limiting of the injector control to the furnishing of such a charge is effected by a lever 30 fixed to the shaft 8 and adapted to engage a fixed stop 31 which is in the form of an adjustable stop screw mounted in a portion of the governor housing 14 and locked in the desired set position by a lock nut 32. In the full line position shown in Fig. 1 the lever 30 is held against the fixed stop 31 through the action of the spring 24, shaft 23, link 25, and lever 26 secured to shaft 8.

When the lever 26 is shifted to the dotted line position shown in Fig. 1, the link 25 moves to pull the shaft 23 up to its dotted line position and swing crank 20 up in under a notch 33 in a lever arm 34 forming a part of lever 30 and swings said lever so as to turn the metering control shaft 8 to a position for idling speed setting of the injectors, and since arm 20 is connected to arm 17 through the pin 19 and member 17 is fixed to member 11, further control of the metering of fuel to the injectors will then be under governor control. When the arm 20 moves to its upper dotted line position, it turns the shaft 19 to swing the arm 21 down to its dotted line position, thus disconnecting the gas control arm 29 from operative connection with the member 11, so that under these conditions the engine is working in normal manner on oil or diesel fuel, the governor then acting through member 11 on shaft 8 to shift said shaft to control the metering of fuel to the injectors under changes of speed and load.

When as previously described the lever 26 is in position for operation on pilot ignition fuel charge and gas with the governor operating through member 11 to control arm 29, this arm effects the gas control in the following manner: The outer end of arm 29 has one end of a link 35 operatively connected thereto through a ball and socket joint connection (not shown in detail) and the other end of this link is similarly connected to one arm of a bell crank lever 36 pivoted on the engine at 37 and having its other arm operatively connected by a ball and socket joint connection 38 (not detailed) with one end of a link 39 whose other end is connected by a pin 40' to a crank arm 40 mounted on a shaft 41 integral with a piston gas metering valve 42 working in the bore 43 of a valve housing 44 mounted on the inlet portion of the outlet manifold 45.

Gaseous fuel from a suitable source of supply is conducted through a supply pipe 46 provided with a shut off cock 47, and strainer 48 to a reduced pressure regulator 49 of known construction where its pressure is reduced from supply pressure in the mains to a pressure of six to seven inches of water and is then conducted by pipe 50 to a so-called device zero pressure governor 51 into which it is led through a fixed orifice 52 of smaller diameter than the pipe 50. The device 51 while called a zero pressure governor does not reduce the gas pressure exactly to zero, but it reduces it to a value close to zero, for example, to a pressure about one-eighth inch of water, and at this very low pressure the gas passes through an elongated opening 53 in the valve housing, as shown in Figs. 5 and 6, which is adapted to cooperate with a slot 54 of generally similar dimensions in the valve 42 to allow gas to pass into an outlet tube 55 which projects into the inlet passage 56 for the manifold 45, so that the gas may mix with the air being drawn into the engine through said passage 56 from passages which include an air cleaner 57. The positioning of the slot 54 relative to the opening 53 by the movement of valve 42 under the control of the governor operated member 11 determines the size of the gas inlet opening and hence the amount of gas mixed with the air when the engine is operating on gas, the proportion of gas to air being such that there is always an excess amount of air over the theoretical requirements for a gas, air fuel mixture, the amount of gas being used corresponding in heating value to an equivalent amount of oil when the engine is running on oil. The restriction provided by the orifice 52 has been found to prevent surges in the gas supply line, and the very low entrance pressure of the gas into the engine has been found to be advantageous for efficient metering of the gas charge at all speeds and loads when the engine is operated on gas with ignition of the charges through the compression ignition of the pilot oil fuel charges. The simple form of plug or piston metering valve 42 is of advantage in servicing an engine of this type.

We desire it to be understood that this invention is not to be limited to any particular form or arrangement of parts except in so far as such limitations are included in the claims.

What we claim as our invention is:

1. In a dual fuel compression ignition internal combustion engine, the combination of means for controlling the amount of fuel oil supplied to the engine including a metering control shaft, means for controlling the amount of gas supplied to the engine including a gas admitting valve, a governor operated member, and means for connecting said member with either said control shaft or said valve including a lever secured to said member, a lever secured to said shaft, a gas control member, and a manually shiftable means pivoted to the lever secured to said member, said manually shiftable means having a part movable into engagement with the lever secured to said shaft for controlling said shaft by said governor operated member when the engine is operated on oil as fuel and having another part movable to locked engagement with said gas control member when the engine is operated on gas, and means for shifting said metering control shaft to a pilot fuel charge position when said shiftable means has been moved to put the engine on gas.

2. In a dual fuel compression ignition internal combustion engine, the combination of means for controlling the amount of fuel oil supplied to the engine including an oscillatory metering control shaft, means for controlling the amount of gas supplied to the engine including an oscillatory lever, a governor operated member having a lever arm, a shaft mounted on said arm and carrying arms, a lever secured to said control shaft, a manually shiftable means connected with the shaft on said arm for selectively shifting said arms to bring one of said arms in operative connection with the lever on said control shaft for controlling said shaft by said governor operated member when the engine is operated on oil as fuel and to bring the other of said arms in locked engagement with said oscillatory gas control lever when the engine is operated on gas, and means operable through said shiftable means to maintain said metering control shaft in a pilot fuel charge position when said shiftable means has been moved to put the engine on gas.

JOHN H. HOLLOWAY.
KENNETH G. JONES.

REFERENCES CITED

The following references are of record in the file of this patent:

UNITED STATES PATENTS

| Number | Name | Date |
|---|---|---|
| 2,400,219 | Barnaby et al. | May 14, 1946 |
| 2,400,247 | Miller et al. | May 14, 1946 |